United States Patent
Harrison

(10) Patent No.: US 8,884,598 B2
(45) Date of Patent: Nov. 11, 2014

(54) METHOD AND APPARATUS FOR OPERATING A DC/DC CONVERTER

(75) Inventor: William Todd Harrison, Apex, NC (US)

(73) Assignee: Texas Instruments Incorporated, Dallas, TX (US)

( * ) Notice: Subject to any disclaimer, the term of this patent is extended or adjusted under 35 U.S.C. 154(b) by 207 days.

(21) Appl. No.: 13/399,077

(22) Filed: Feb. 17, 2012

(65) Prior Publication Data

US 2012/0212203 A1 Aug. 23, 2012

Related U.S. Application Data

(60) Provisional application No. 61/444,047, filed on Feb. 17, 2011.

(51) Int. Cl.
*G05F 1/00* (2006.01)
*H02M 3/156* (2006.01)
*H02M 1/00* (2006.01)

(52) U.S. Cl.
CPC ...... *H02M 3/156* (2013.01); *H02M 2001/0032* (2013.01); *Y02B 70/16* (2013.01)

USPC .......................................................... 323/283

(58) Field of Classification Search
USPC .................................. 323/222, 271, 282–285
See application file for complete search history.

(56) References Cited

U.S. PATENT DOCUMENTS

| | | | |
|---|---|---|---|
| 7,382,114 B2 * | 6/2008 | Groom | 323/271 |
| 7,872,456 B2 | 1/2011 | Li | |
| 2011/0221414 A1 * | 9/2011 | Pigott et al. | 323/283 |
| 2012/0038331 A1 * | 2/2012 | Wu et al. | 323/235 |

* cited by examiner

*Primary Examiner* — Adolf Berhane
*Assistant Examiner* — Afework Demisse
(74) *Attorney, Agent, or Firm* — William B. Kempler; Frederick J. Telecky, Jr.

(57) ABSTRACT

A method of operating a DC/DC converter in a continuous-conduction mode (CCM) or in a discontinuous-conduction mode (DCM) to produce an output voltage, the DC/DC converter setting a pulse width modulation in CCM based on a COMP signal that varies as a function of the output voltage, the method including capturing the COMP signal utilizing a digital-to-analog converter at a transition between CCM and DCM, and varying a frequency of operation of the DC/DC converter in DCM based on the captured COMP signal.

19 Claims, 4 Drawing Sheets

METHOD AND APPARATUS FOR OPERATING A DC/DC CONVERTER

CROSS-REFERENCE TO RELATED APPLICATIONS

The present application claims priority to provisional application Ser. No. 61/444,047, filed Feb. 17, 2011, which is incorporated herein by reference in its entirety.

FIELD OF THE INVENTION

The field of the invention relates to a method of operating a DC/DC converter and corresponding DC/DC converters. In particular, the invention relates to such methods and DC/DC converters that operate a DC/DC converter in a continuous-conduction mode (CCM) or in a discontinuous-conduction mode (DCM).

BACKGROUND OF THE INVENTION

Many modern electronic systems utilize a DC/DC converter as part of a power supply circuit. These systems are often battery powered, and it is desirable to utilize as little battery power as is needed. A DC/DC converter can provide a regulated output with a controlled flow of power to a load by controlling an on/off duty cycle of one or more switches coupled to the load.

A typical DC/DC converter may operate in one of two modes, a continuous-conduction mode (CCM) or a discontinuous-conduction mode (DCM). In CCM, the DC/DC converter rapidly switches between an on state and an off state such that the current through the inductor is never fully discharged (equal to zero). In DCM, the current flow through the inductor can be substantially completely discharged at each cycle of the DC/DC converter. At the transition from CCM to DCM, slow transient response and output voltage disturbances or jumps may occur, particularly if there is a sudden load jump out of CCM or load dump into DCM.

SUMMARY OF THE INVENTION

The present invention provides methods of operating a DC/DC converter and corresponding DC/DC converters in a continuous-conduction mode (CCM) or in a discontinuous-conduction mode (DCM) to produce an output voltage, the DC/DC converter setting a pulse width modulation in CCM based on a COMP signal that varies as a function of the output voltage. The methods include capturing the COMP signal utilizing a digital to analog converter at a transition between CCM and DCM, and varying a frequency of operation of the DC/DC converter in DCM based on the captured COMP signal.

Other aspects, features, and advantages of the present invention will become apparent from the following detailed description when taken in conjunction with the accompanying drawings, which are a part of this disclosure and which illustrate, by way of example, principles of the invention.

BRIEF DESCRIPTION OF THE DRAWINGS

The accompanying drawings facilitate an understanding of the various examples of this technology. In such drawings.

DETAILED DESCRIPTION

The following description is provided in relation to several embodiments which may share common characteristics and features. It is to be understood that one or more features of any one embodiment may be combinable with one or more features of the other embodiments. In addition, any single feature or combination of features in any of the embodiments may constitute additional embodiments.

The disclosed methods of operating a DC/DC converter and corresponding DC/DC converter provide fast transient response and a reduction in or elimination of output voltage disturbances or jumps at the transition from CCM to DCM. The methods operate the DC/DC converter in a continuous-conduction mode (CCM) or in a discontinuous-conduction mode (DCM) to produce an output voltage, the DC/DC converter setting a pulse width modulation in CCM based on a COMP signal that varies as a function of the output voltage. The methods operate the DC/DC converter by capturing the COMP signal utilizing a digital-to-analog converter at a transition between CCM and DCM, and varying a frequency of operation of the DC/DC converter in DCM based on the captured COMP signal, as further discussed below.

Figure 1:
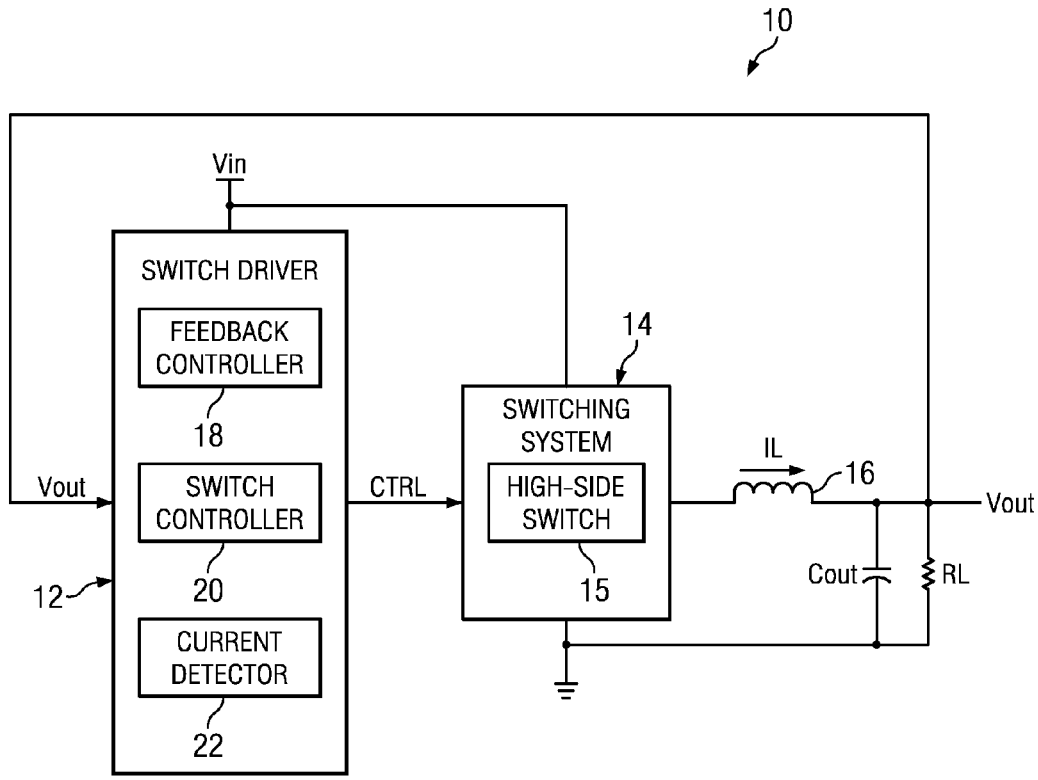
FIG. 1 depicts a schematic view of a DC/DC converter according to the embodiments of the invention.

FIG. 1 illustrates an example of a DC/DC converter 10 in accordance with aspects of the invention. The DC/DC converter 10 is configured to generate an output voltage Vout across a load, demonstrated in the example of FIG. 1 as a resistor RL, based on a power voltage Vin. As an example, the power voltage Vin can be a voltage provided from a high-voltage power rail, such as provided from a battery, relative to a low-voltage power rail, demonstrated in the example of FIG. 1 as ground. The DC/DC converter 10 can be implemented in any of a variety of electronic devices, such as battery operated portable electronic devices. For example, the DC/DC converter 10 can be implemented in a wireless communication device, laptop computer, or any of a variety of other electronic devices.

The DC/DC converter 10 includes a switch driver 12 and a switching system 14. The switch driver 12 can be configured to generate at least one PWM control signal CTRL having a defined duty-cycle for pulse-width modulation (PWM) control of the switching system 14. The switching system 14 includes at least one power switch that includes a high-side switch 15 that periodically couples the power voltage Vin to an inductor 16 to provide a current IL through the inductor 16. The magnitude of the current IL thus sets a magnitude of the output voltage Vout across the load RL. As an example, the switching system 14 can be configured as a buck converter, such that the output voltage Vout is generated at a magnitude that is less than the power voltage Vin. In addition, a capacitor Cout is coupled in parallel with the load RL between the output voltage Vout and ground. The capacitor Cout charges and discharges to maintain a substantially constant magnitude of the output voltage Vout.

The switch driver 12 includes a feedback controller 18. The feedback controller 18 can be configured to define an edge-trigger of the PWM control signal CTRL, such as to activate the high-side switch 15 to couple the power voltage Vin to the inductor 16. As an example, the feedback controller 18 can include circuitry that can generate an error voltage based on a relative magnitude of the output voltage Vout and a predetermined reference voltage. The error voltage can thus be compared with a fixed-frequency ramp signal, such that the edge-trigger of the PWM control signal CTRL can occur in response to the error voltage having a magnitude that is greater than the fixed-frequency ramp signal.

The switch driver 12 also includes a switch controller 20. The switch controller 20 can be configured to define the duty-cycle of the PWM control signal CTRL, such as corresponding to the activation pulse-width of the high-side switch 15. As an example, the switch controller 20 can cooperate with the feedback controller 18 to set the duty-cycle of the PWM control signal CTRL. The switch controller 20 can also be configured to define the duty-cycle of the PWM control signal CTRL based on the mode of operation of the power regulator system 10. For example, the switch controller 20 can be configured to set the duty-cycle of the PWM control signal CTRL differently in each of a continuous conduction mode (CCM) of operation and a discontinuous conduction mode (DCM) of operation. As described herein, the CCM is defined as the operating mode of the power regulator system 10 in which the current IL through the inductor 16 is never fully discharged (i.e., equal to zero). Conversely, as described herein, the DCM is defined as the operating mode of the power regulator system 10 in which the current IL through the inductor 16 can be substantially completely discharged before the next edge-trigger of the PWM control signal CTRL.

As an example, the switch controller 20 can set the duty-cycle of the PWM control signal CTRL in the CCM based on the comparison of the error voltage and the ramp signal, such as based on the operation of the feedback controller 18 as described above. However, after a transition to the DCM, the feedback controller 18 can be configured to decrease the magnitude of the error signal, such as by a magnitude that is proportional to the output voltage Vout. As a result, the timing of the edge-trigger in the DCM can vary depending on a relative magnitude of the output voltage Vout and the power voltage Vin to compensate for a light-load condition (e.g., a decrease in the load RL).

The switch driver 12 further includes a current detector 22. The current detector 22 is configured to detect a substantially zero magnitude of the current IL through the inductor 16. For example, the current detector 22 can be configured as a comparator that monitors a magnitude of a voltage at an input of the inductor 16 relative to ground. The current detector 22 can thus be implemented by the switch controller 20 to detect an operating mode transition of the power regulator system 10. For example, the switch controller 20 can detect a transition from the CCM to the DCM based on the current detector 22 detecting a substantially zero magnitude of the current IL. As another example, the switch controller 20 can detect a transition from the DCM to the CCM based on the current detector 22 detecting a substantially non-zero magnitude of the current IL at an edge-trigger of the PWM control signal CTRL. Therefore, the switch controller 20 can identify the operating mode of the power regulator system 10 and can set the duty-cycle of the PWM control signal CTRL accordingly.

It is to be understood that the power regulator system 10 is not intended to be limited to the example of FIG. 1. For example, the PWM control signal CTRL is demonstrated as a single signal in the example of FIG. 1 to control the high-side switch 15. However, the switching system 14 can include more than one switch, such as high and low-side switches, to control the current IL to regulate the output voltage Vout. Therefore, the switch driver 12 can be configured to provide multiple signals to the switching system 14 to control the current IL. As another example, the power regulator system 10 is not limited to operation as a buck converter, but could instead be configured as a boost or buck-boost converter.

Figure 2:
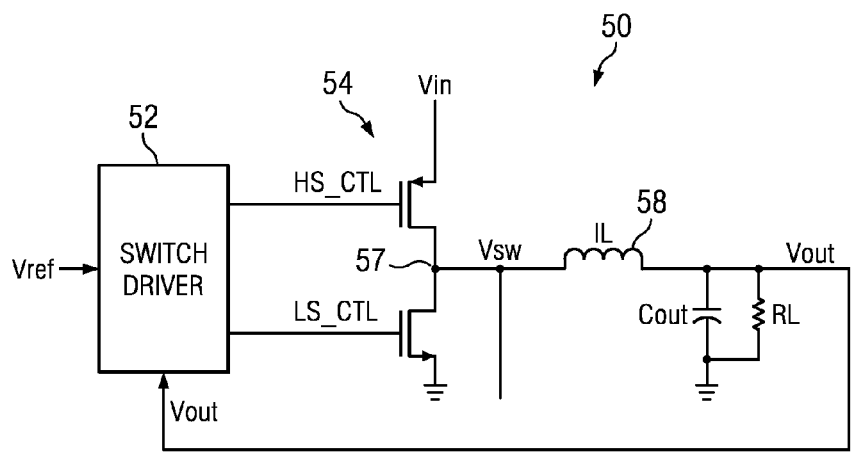
FIG. 2 depicts a schematic view of a DC/DC converter according to the embodiments of the invention.

FIG. 2 illustrates another example of a DC/DC converter 50 in accordance with aspects of the invention. Similar to as described in the example of FIG. 1, the DC/DC converter 50 is configured to generate an output voltage Vout across a load, demonstrated in the example of FIG. 2 as a resistor RL, based on a power voltage Vin. As an example, the power voltage Vin can be a voltage provided from a high-voltage power rail, such as provided from a battery or other power source, relative to a low-voltage power rail, demonstrated in the example of FIG. 2 as ground.

The DC/DC converter 50 includes a switch driver 52 and a switching system 54. In the example of FIG. 2, the switching system 54 includes a high-side switch HS1 and a low-side switch LS1 that are interconnected between the power voltage Vin and ground. In the example of FIG. 2, the high and low-side switches HS1 and LS1 are demonstrated as a P-type field effect transistor (FET) and an N-type field effect transistor, respectively, but it is to be understood that any of a variety of transistors can be implemented in the switching system 54. The high-side switch HS1 and the low-side switch LS1 are controlled, respectively, by signals HS_CTL and LS_CTL that are generated by the switch driver 52. Thus, the high-side switch HS1 is periodically activated to couple the power voltage Vin to a node 57 having Vsw at an input of an inductor 58. Therefore, a current IL is provided through the inductor 58, which thus sets a magnitude of the output voltage Vout across the load RL. The low-side switch LS1 is also periodically activated to maintain the current IL through the inductor 58 to efficiently provide the output voltage Vout. The switching of the high and low-side switches HS1 and LS1 is thus based on a switching duty-cycle. It is to be understood that, in the example of FIG. 2, each of the signals can be respective PWM control signals, with the signal HS_CTL having a duty-cycle that defines the activation pulse-width of the high-side switch HS1. In addition, a capacitor Cout is coupled in parallel with the load RL between the output voltage Vout and ground. The capacitor Cout charges and discharges to maintain a substantially constant magnitude of the output voltage Vout.

The switch driver 52 may include a current detector that is configured to detect a substantially zero magnitude of the current IL through the inductor 58, such as the current detector 22 of FIG. 1. In the example of FIG. 2, the current detector can include a comparator that monitors a magnitude of the voltage Vsw relative to ground to determine if the magnitude of the current IL becomes approximately zero. As described herein, the switch driver 52 can detect an operating mode transition of the power regulator system 50. For example, detection of a zero magnitude of the current IL can signify a transition from the CCM to the DCM. As another example, detection of a non-zero magnitude of the current IL can signify a transition from the DCM to the CCM.

Figure 3:
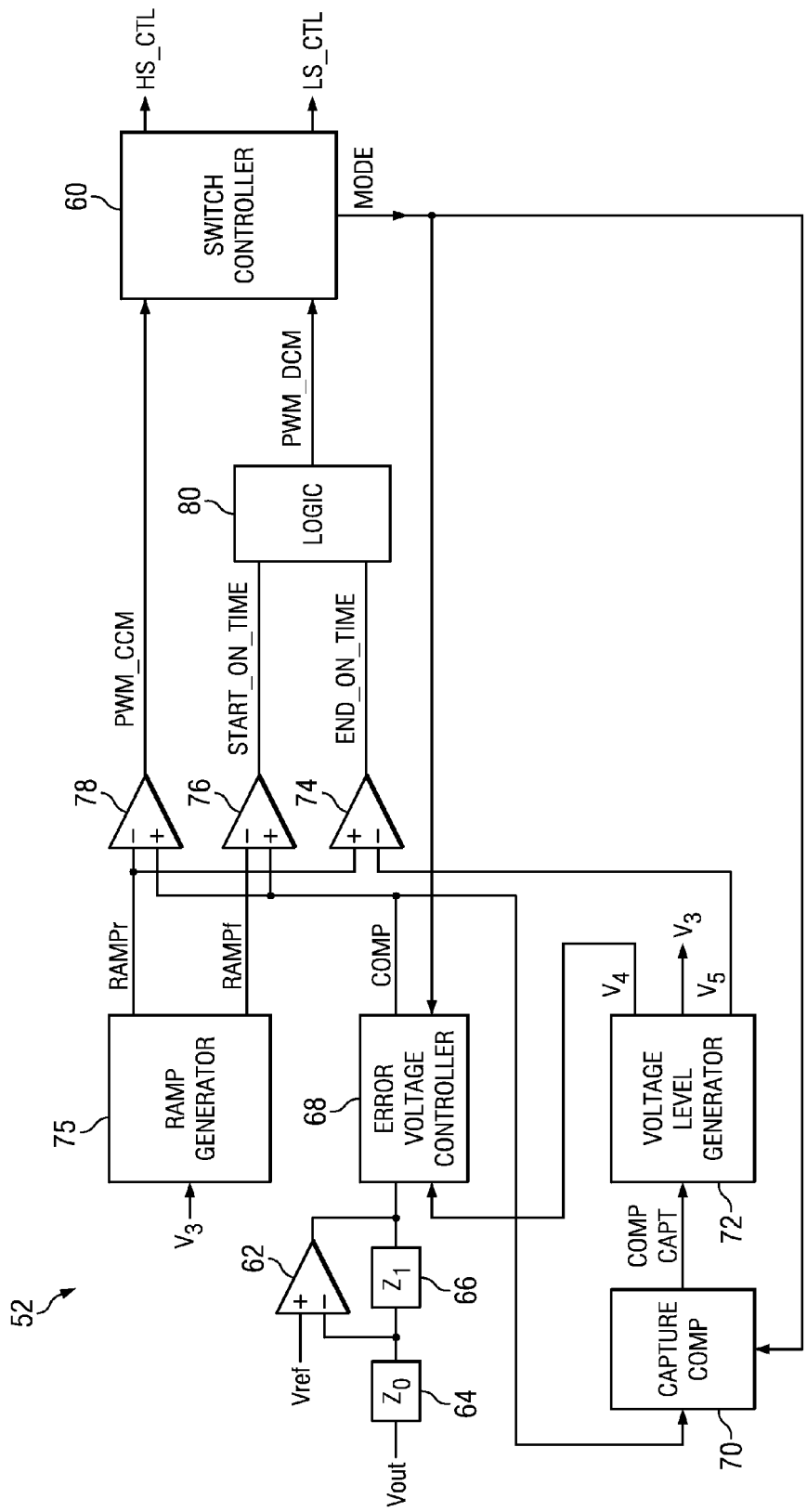
FIG. 3 depicts a schematic view of switch driver of a DC/DC converter according to embodiments of the invention.

Further details of the switch driver 52 are illustrated in FIG. 3. The switch driver 52 includes a switch controller 60 that generates the control signals HS_CTL and LS_CTL for driving the high and low side switches HS1 and LS1, amplifier 62, comparators 74, 76 and 78, error voltage controller 68, capture comp element 70, voltage level generator 72, ramp generator 75 and logic 80.

The amplifier 62, in combination with impedances 64 and 66, is configured to generate an error voltage Ve. Specifically, the amplifier 62 receives the output voltage of the DC/DC converter Vout at an inverting input via impedance Z0 64 and receives a reference voltage Vref at a non-inverting input. Thus, the error amplifier 62 regulates the error voltage Ve via a feedback arrangement with respect to an impedance Z1 as an error signal based on the output voltage Vout and the reference voltage Vref.

The switch controller 60 is configured to generate a MODE signal when the DC/DC converter 50 transitions from CCM to DCM. For example, the MODE signal may go high when the DCM is detected and go low when the CCM is detected. The MODE signal is input to the error voltage controller 68, to the ramp generator 75, and to the capture comp 70.

When the DC/DC converter is operating in CCM, error voltage controller 68 generates the COMP signal based on the error voltage Ve, which as explained above is generated based on the output voltage Vout and the reference voltage Vref.

When the DC/DC converter transitions from CCM to DCM, the mode signal MODE changes state, and the capture comp element 70 is configured to capture the COMP signal output from the error voltage controller 68 at the transition from CCM to DCM as the COMP CAPT signal.

Figure 6:
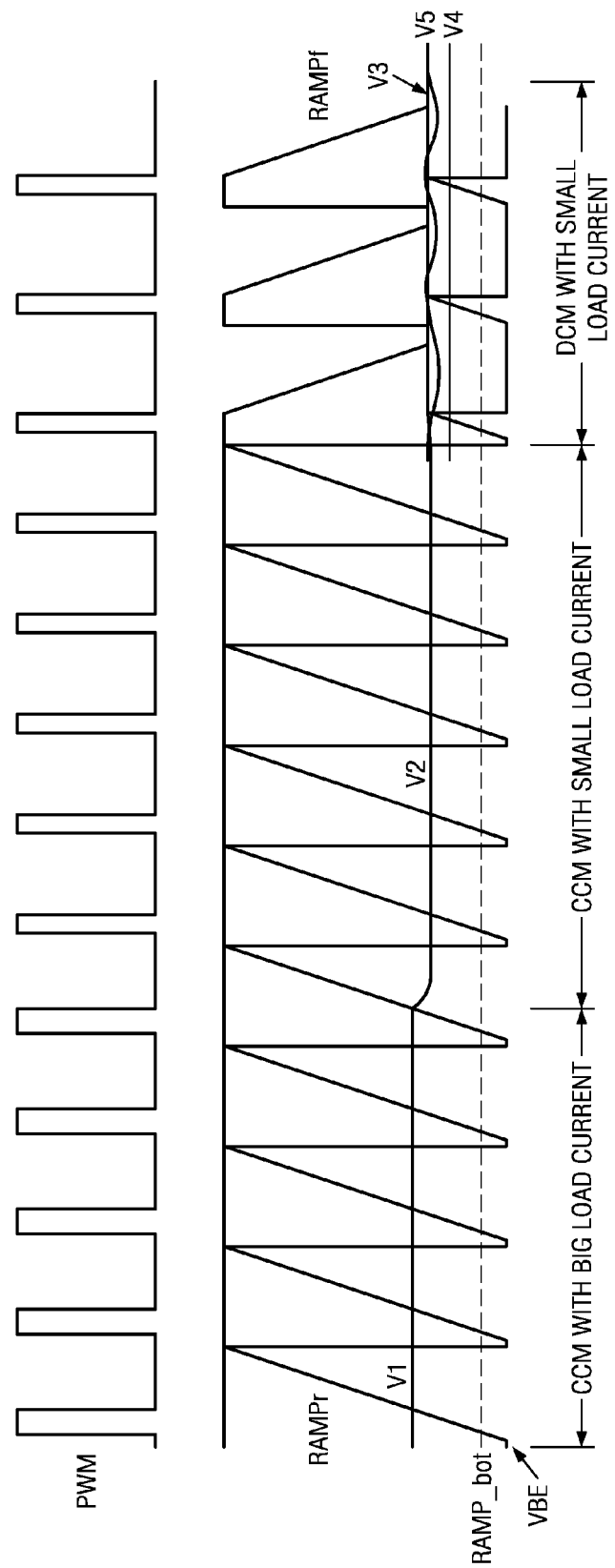
FIG. 6 depicts a timing diagram of signals used with a DC/DC converter in accordance with embodiments of the invention.

The voltage level generator 72 receives the COMP CAPT signal, and generates voltage signals: falling ramp (RAMPf) lower limit voltage V3, lower limit error voltage V4, and CCM/DCM boundary COMP voltage V5. FIG. 6 illustrates the waveforms for the V3, V4 and V5 voltage signals, as well as for the voltage signals V1 and V2 in CCM. V1 depicts the COMP signal at high load CCM and V2 depicts the COMP signal at low load CCM.

When the COMP CAPT signal is received by the voltage level generator, it generates the voltage signals V3, V4 and V5. V4 is utilized by the error voltage controller 68 to generate a varied COMP signal for use in DCM operation upon receipt of the MODE signal by the error voltage controller 68. V4 sets a level at which the COMP signal cannot go below while in DCM. This allows a fast transition to a steady state when the DC/DC controller changes from DCM to CCM. It should be understood that some embodiments of the invention can exclude the function of voltage V4, though this is one possible implementation.

The V3 voltage signal is utilized by the ramp generator 75 as a clamp voltage on the falling ramp RAMPf signal, such that falling ramp RAMPf cannot go below V3. The falling ramp RAMPf signal is directed to the inverting input of comparator 76, and the varied COMP signal is directed to the non-inverting input of comparator 76. Comparator 76 thus produces the START_ON_TIME signal based on a comparison of the falling ramp RAMPf and varied COMP signals.

The ramp generator 75 also generates the rising ramp RAMPr signal. The rising ramp RAMPr signal is directed to the non-inverting input of comparator 74 and the voltage signal V5 is directed to the inverting input of the comparator 74. The comparator 74 thus generates the END_ON_TIME signal based on a comparison of the rising ramp RAMPr signal and the V5 signal.

The rising ramp RAMPr signal is directed to the inverting input of comparator 78, and the COMP signal is directed to the non-inverting input. The comparator 78 generates the PWM_CCM control signal based on a comparison of the rising ramp RAMPr signal and the COMP signal. The PWM_CCM control signal is used by switch controller 60 to control activation of the switches HS1 and LS1 during CCM based operation of the DC/DC converter.

Logic 80 receives the START_ON_TIME and END_ON_TIME signals and generates the PWM_DCM control signal, which is directed to switch controller 60. The PWM_DCM control signal is used by switch controller 60 to control activation of the switches HS1 and LS1 during DCM based operation of the DC/DC converter. By capturing the COMP signal at the CCM to DCM transition, the DC/DC converter is able to smooth any transient jumps in output voltage by varying PWM_DCM control signal and hence the frequency of operation of the switches of the DC/DC converter.

Figure 4:
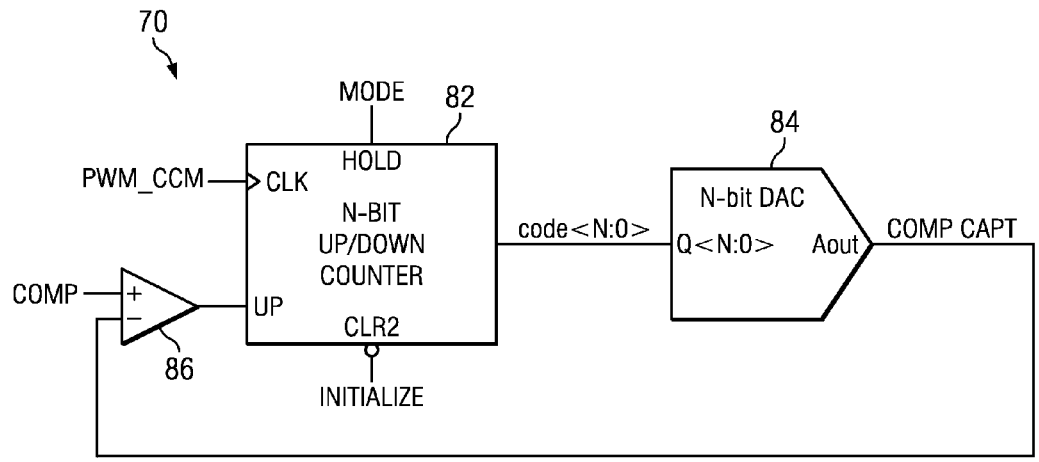
FIG. 4 depicts a schematic view of capture comp element of a DC/DC converter in accordance with embodiments of the invention.

FIG. 4 illustrates further details of the capture comp 70 of FIG. 3. The capture comp 70 includes comparator 86, N-bit up/down counter 82 and N-bit DAC 84. The N-bit DAC 84 outputs a signal COMP_CAPT based on an input signal code<N:0>. The comparator 86 receives the COMP signal and compares it with the signal COMP_CAPT, which is output from the N-bit DAC 84. The result of this comparison is directed to the N-bit up/down counter 82. The N-bit up/down counter 82 generates a digital version of the COMP signal while the MODE signal is indicating that the DC/DC converter is in CCM. The N-bit up/down counter 82 is allowed to increment or decrement its output code<N:0> signal once per cycle as commanded by the PWM_CCM signal.

The loop made up of the comparator 86, N-bit up/down counter 82, and N-bit DAC 84 operates while in CCM to converge the COMP_CAPT signal to the input COMP signal. Upon receiving a MODE signal indicating that the DC/DC converter is transitioning to DCM, the N-bit up/down counter 82 stops incrementing or decrementing its output code<N:0> and holds the code<N:0> signal so that the output of the N-bit DAC 84 maintains its output voltage COMP_CAPT for use in the DCM operation. Note that the CLK input to the N-bit up/down counter 82 is driven by the PWM_CCM signal. This is a convenient clocking signal because it will limit how fast that the COMP_CAPT loop can move when there are large signal disturbances on the input COMP; for example, when the load quickly increases or decreases.

Figure 5:
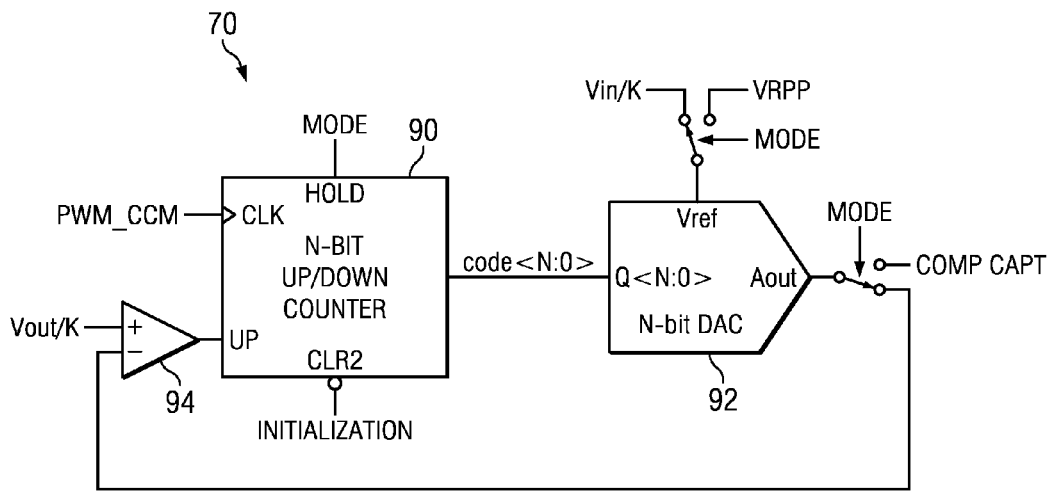
FIG. 5 depicts a schematic view of capture comp element of a DC/DC converter in accordance with embodiments of the invention.

FIG. 5 illustrates further details of an alternative capture comp 70 of FIG. 3. The capture comp 70 includes comparator 94, N-bit up/down counter 90 and N-bit DAC 92. The comparator 94 receives Vout divided by constant K at the non-inverting input and a feedback voltage from the output of the N-bit DAC 92. The comparator 94 sends the result of its comparison to the N-bit up/down counter which outputs the signals code<N:0>. The signals code<N:0> control the N-bit DAC 92, which outputs a voltage. While in CCM, the loop made up of the comparator 94, the N-bit up/down counter, and the N-bit DAC 92 attempts to follow or converge upon the Vout/K signal. Also while in CCM, the Vref terminal of the N-bit DAC 92 receives the voltage Vin/K and the Aout terminal is fed back to the comparator 94. The N-bit digital-to-analog converter 92 converts the signal into the COMPCAPT signal upon receiving the MODE signal indicating the DC/DC converter has transitioned to DCM.

When the DC/DC converter is in DCM, the N-bit up/down counter 90 stops incrementing or decrementing its count, i.e. code<N:0>, and the N-bit DAC outputs Aout to the COMP_CAPT signal. In order for the duty cycle to be correct, the Vref input of the N-bit DAC receives the VRPP voltage, which is the amplitude of the rising ramp voltage RAMPr in CCM. The COMP_CAPT signal level will be at approximately the COMP level in CCM just before entering DCM. This provides a smooth transition between CCM and DCM to avoid large disturbances on the Vout of the DC/DC converter. Note that the CLK input to the N-bit up/down counter 90 is driven by the PWM_CCM signal. This is a convenient clocking signal because it will limit how fast that the COMP_CAPT loop can move when there are large signal disturbances on the input Vout/K; for example, when the load quickly increases or decreases.

Figure 7:
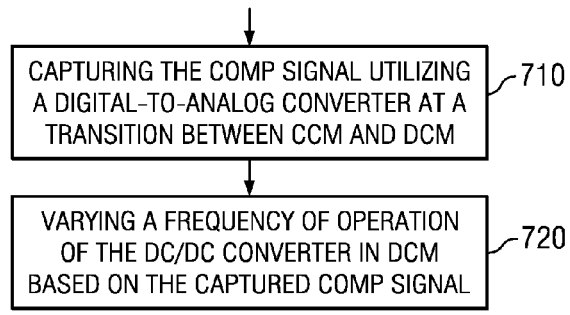
FIG. 7 depicts a flowchart in accordance with embodiments of the invention.

FIG. 7 is a flow chart illustrating operation of the DC/DC converter. In step 710, the COMP signal is captured utilizing a digital-to-analog converter at a transition between CCM and DCM. This step may be accomplished by the digital-to-analog converter 84 or the digital-to-analog converter 92 illustrated in FIGS. 4 and 5, for example, although other circuits or software could accomplish the capture.

In step 720, the frequency of operation of the DC/DC converter in DCM is varied based on the captured COMP signal. This step may be accomplished by the switch driver 52 of FIG. 3, for example, although other circuits or software could accomplish the varying.

While the invention has been described in connection with what are presently considered to be the most practical embodiments, it is to be understood that the invention is not to be limited to the disclosed embodiments, but on the contrary, is intended to cover various modifications and equivalent arrangements included within the spirit and scope of the invention. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A method of operating a DC/DC converter in a continuous-conduction mode (CCM) or in a discontinuous-conduction mode (DCM) to produce an output voltage, the DC/DC converter setting a pulse width modulation in CCM based on a COMP signal that varies as a function of the output voltage, the method comprising:
   capturing the COMP signal utilizing a digital-to-analog converter at a transition between CCM and DCM; and
   varying a frequency of operation of the DC/DC converter in DCM based on the captured COMP signal, by comparing a difference between the captured COMP signal with the actual COMP signal during every cycle of the DC/DC converter.

2. The method of claim 1, wherein varying the frequency of operation of the DC/DC converter in DCM based on the captured COMP signal comprises generating an error voltage based on the output voltage and a reference voltage, and varying the COMP signal in DCM based on the error voltage and the captured COMP signal.

3. The method of claim 1, wherein capturing the COMP signal utilizing a digital-to-analog converter at a transition between CCM and DCM comprises generating a digital representation of the COMP signal, and converting the digital representation of the COMP signal to the captured COMP signal with the digital-to-analog converter.

4. The method of claim 3, wherein generating a digital representation of the COMP signal comprises comparing the COMP signal to the captured COMP signal, and outputting a result of the comparison to an N-bit up/down counter, the N-bit up/down counter configured to generate the digital representation of the COMP signal from the result of the comparison.

5. The method of claim 3, further comprising converging the captured COMP signal to the COMP signal during CCM operation of the DC/DC converter.

6. The method of claim 1, wherein capturing the COMP signal utilizing a digital-to-analog converter at a transition between CCM and DCM comprises generating a digital representation of the COMP signal based on the output voltage Vout divided by a constant K.

7. A method of operating a DC/DC converter in a continuous-conduction mode (CCM) or in a discontinuous-conduction mode (DCM) to produce an output voltage, the DC/DC converter setting a pulse width modulation in CCM based on a COMP signal that varies as a function of the output voltage, the method comprising:
   capturing the COMP signal utilizing a digital-to-analog converter at a transition between CCM and DCM; and
   varying a frequency of operation of the DC/DC converter in DCM based on the captured COMP signal, wherein varying the frequency of operation of the DC/DC converter in DCM based on the captured COMP signal comprises generating an error voltage based on the output voltage and a reference voltage, and varying the COMP signal in DCM based on the error voltage and the captured COMP signal and wherein varying the frequency of operation of the DC/DC converter in DCM based on the captured COMP signal further comprises generating a rising ramp RAMPr signal and a falling ramp RAMPf signal based on the captured COMP signal, comparing the falling ramp RAMPf signal to the varied COMP signal to generate a START_ON_TIME signal, and varying the frequency of operation of the DC/DC converter based on the START_ON_TIME signal.

8. The method of claim 7, wherein varying the frequency of operation of the DC/DC converter in DCM based on the captured COMP signal further comprises comparing the rising ramp RAMPr signal to a voltage signal derived from the captured COMP signal to generate an END_ON_TIME signal, generating a PWM_DCM control signal based on the START_ON_TIME signal and the END_ON_TIME signal, and varying the frequency of operation of the DC/DC converter based on the PWM_DCM control signal.

9. The method of claim 8, further comprising comparing the rising ramp RAMPr signal to the COMP signal to generate a PWM_CCM control signal, and controlling operation of the DC/DC converter in CCM based on the PWM_CCM control signal.

10. A DC/DC converter that operates in a continuous-conduction mode (CCM) or in a discontinuous-conduction mode (DCM) to produce an output voltage, the DC/DC converter setting a pulse width modulation in CCM based on a COMP signal that varies as a function of the output voltage, comprising:
    a digital-to-analog converter that captures the COMP signal at a transition between CCM and DCM; and
    a driver configured to vary the frequency of operation of the DC/DC converter in DCM based on the captured COMP signal, by comparing a difference between the captured COMP signal with the actual COMP signal during every cycle of the DC/DC converter.

11. The DC/DC converter of claim 10, further comprising an error amplifier configured to generate an error voltage based on the output voltage and a reference voltage.

12. The DC/DC converter of claim 10, further comprising an N-bit up/down counter configured to generate a digital representation of the COMP signal captured at the transition from CCM to DCM, wherein the digital-to-analog converter converts the digital representation of the COMP signal to the captured COMP signal.

13. The DC/DC converter of claim 12, further comprising a fourth comparator configured to compare the COMP signal to the captured COMP signal, and output a result of the comparison to the N-bit up/down counter, the N-bit up/down counter configured to generate the digital representation of the COMP signal from the result of the comparison.

14. The DC/DC converter of claim 13, wherein the N-bit up/down counter and the digital-to-analog converter are configured to converge the captured COMP signal to the COMP signal during CCM operation of the DC/DC converter.

15. A DC/DC converter that operates in a continuous-conduction mode (CCM) or in a discontinuous-conduction mode (DCM) to produce an output voltage, the DC/DC converter setting a pulse width modulation in CCM based on a COMP signal that varies as a function of the output voltage, comprising:
- a digital-to-analog converter that captures the COMP signal at a transition between CCM and DCM; and
- a driver configured to vary the frequency of operation of the DC/DC converter in DCM based on the captured COMP signal further comprising:
- a voltage level generator configured to generate a falling RAMP lower limit voltage, a lower limit error voltage, and a CCM/DCM boundary COMP voltage;
- an error amplifier configured to generate an error voltage based on the output voltage and a reference voltage; and
- an error voltage controller configured to vary the COMP signal in DCM based on the error voltage and the lower limit error voltage.

16. The DC/DC converter of claim 15, further comprising:
- a ramp generator configured to generate a rising ramp RAMPr signal and a falling ramp RAMPf signal;
- a first comparator configured to compare the falling ramp RAMPf signal to the varied COMP signal to generate a START_ON_TIME signal;
- a second comparator configured to compare the rising ramp RAMPr signal to the CCM/DCM boundary COMP voltage to generate an END_ON_TIME signal; and
- logic configured to receive the START_ON_TIME signal and the END_ON_TIME signal and to generate a PWM_DCM control signal.

17. The DC/DC converter of claim 16, further comprising a third comparator configured to compare the rising ramp RAMPr signal to the COMP signal to generate a PWM_CCM control signal.

18. The DC/DC converter of claim 17, further comprising a switch controller configured to vary the frequency of operation of the DC/DC converter in DCM based on the PWM_CCM control signal.

19. The DC/DC converter of claim 18, wherein the switch controller is further configured to control operation of the DC/DC converter in CCM based on the PWM_CCM control signal.

* * * * *